United States Patent [19]

Matsumoto et al.

[11] Patent Number: 4,490,127
[45] Date of Patent: Dec. 25, 1984

[54] ELECTRICALLY OPERATED TRANSMISSION GEAR SYSTEM FOR BICYCLES

[75] Inventors: Hirofumi Matsumoto; Masakatu Fujiwara, both of Kasai; Yasuyuki Tsuchida, Kanzaki; Yoshifumi Miyazaki, Taka, all of Japan

[73] Assignee: Sanyo Electric Co., Ltd., Osaka, Japan

[21] Appl. No.: 380,894

[22] Filed: May 21, 1982

[30] Foreign Application Priority Data

May 29, 1981 [JP] Japan ................................. 56-83619
Sep. 18, 1981 [JP] Japan ................................ 56-148457

[51] Int. Cl.³ .............................................. F16H 7/22
[52] U.S. Cl. ..................................... 474/110; 280/236; 364/424.1; 474/71
[58] Field of Search ...................... 474/71, 110; 866; 280/236; 364/424.1

[56] References Cited

U.S. PATENT DOCUMENTS

2,891,411 6/1959 Sutherland et al. .................. 74/866
3,182,778 5/1965 Droschel ............................. 74/866
3,688,607 9/1972 Marlow ............................... 74/866
4,143,557 3/1979 Wakebe et al. .................. 280/236 X
4,294,341 10/1981 Swart ............................... 74/866 X

Primary Examiner—Leslie A. Braun
Assistant Examiner—Dwight G. Diehl
Attorney, Agent, or Firm—Hubbell, Cohen, Stiefel & Gross

[57] ABSTRACT

An electrically operated transmission gear system for a bicycle includes a plurality of transmission gears selectively drivable by an endless chain trained around a pedal-driven crank gear, a reversible motor, a takeup reel drivable thereby, and a wire connected at one end to the takeup reel and at the other end to a chain guide for shifting the endless chain into driving mesh with one of the transmission gears at a time. The transmission gear system also includes means for measuring the speed of travel of the bicycle and/or the speed of rotation of the crank gear, means for detecting a transmission ear with which the endless chain is in driving mesh, and an arithmetic unit for deriving a proper speed range from one of the measuring and detecting means and for comparing an output from the other means with the proper speed range as derived to determine whether the transmission gear held in mesh wish the endless chain is proper or not, whereby gear-shifting for the bicycle can be properly controlled.

30 Claims, 12 Drawing Figures

ELECTRICALLY OPERATED TRANSMISSION GEAR SYSTEM FOR BICYCLES

BACKGROUND OF THE INVENTION

1. Field of the Invention

The present invention relates to an electrically operated transmission gear system for use on a bicycle, and more particularly to such a transmission gear system for automatically selecting a transmission gear best suited for the speed of travel of the bicycle and/or the speed of rotation of a crank gear. The present invention is also concerned with a bicycle equipped with such an electrically operated transmission gear system.

2. Prior Art

There has been known a transmission gear system with electrically controlled gearshifting, as disclosed in U.S. Pat. No. 4,143,557, patented Mar. 13, 1979. The transmission gear system includes a manually operated switch mounted on a handle of a bicycle for electrically actuating a gearshifting means for the transmission gears. With the disclosed system, selection of a transmission gear is up to the rider of the bicycle, who is required to determine a desired transmission gear while taking into consideration the speed at which the bicycle runs and other factors. There is a tendency, however, for the bicycle rider to fail under various conditions to pick out an optimum transmission gear for the speed of travel of the bicycle.

One known arrangement to let the rider know a proper transmission gear for the speed at which the bicycle is running comprises a speedometer including an indication of transmission gears as related to bicycle speeds. This conventional arrangement, however, requires the rider first to confirm an optimum transmission gear corresponding to the speed as indicated on the speedometer, then to determine whether to change gears up or down, and finally to operate the transmission gear system to reach a desired gear. Such a procedure distracts the rider's attention from driving, rendering the bicycle riding less safe on the road.

SUMMARY OF THE INVENTION

With the prior difficulties in view, it is an object of the present invention to provide a transmission gear system having means for automatically determining whether to change gears up or down, for thereby relieving a rider of an effort to do gearshifting.

Another object of the present invention is to provide a bicycle having an electrically operated transmission gear system.

According to the present invention, an electrically operated transmission gear system for bicycles, comprises: a transmission gear unit including a plurality of transmission gears, an endless chain, and a guide for guiding the endless chain into driving mesh with one of the transmission gears at a time; an electrically operated gearshifting mechanism including a reversible motor, a takeup reel actuatable by the reversible motor, and a wire joined to the takeup reel and the guide for displacing the latter in response to rotation of the takeup reel to shift the endless chain into driving mesh with one of the transmission gears; means for measuring the speed at which the bicycle is running and/or the speed of rotation of a crank gear of the bicycle with which the endless chain is in mesh; means for detecting which transmission gear is in mesh with the endless chain; an arithmetic unit for deriving a proper range signal from an output from one of the measuring and detecting means and for comparing the proper range signal with an output from the other means to determine whether the transmission gear with which the endless chain is in mesh is proper or not; a source of DC electric power for powering the reversible motor and the arithmetic unit; and a switch for turning on and off the source of DC electric power; whereby gearshifting for the bicycle can properly be controlled.

The transmission gear system also includes a motor controller connected between the arithmetic unit and the reversible motor and responsive to an output signal from the arithmetic unit for controlling operation of the reversible motor to shift the endless chain into driving mesh with a proper transmission gear. With such a system, a proper transmission gear is automatically maintained in mesh with the endless chain without requiring a rider of the bicycle to act upon the transmission gear system. Therefore, the rider can drive the bicycle comfortably without having to overrun the crank gear or being fatigued by an overload. Since the rider does not need to do any gearshifting while riding on the bicycle, the rider can direct all of the attention to the bicycle driving, resulting in safer bicycle riding.

The transmission gear system also includes a gear indicator responsive to an output signal from the arithmetic unit for indicating whether the transmission gear held in mesh with the endless chain is too low, too high, or in a proper range, and a gear selecting switch, the motor controller being responsive to an output signal from the gear selecting switch for controlling operation of the reversible motor. With such an arrangement, the bicycle rider can easily maintain a proper transmission gear simply by manipulating the gear selecting switch dependent on the indication of the gear indicator. In this mode of operation, the rider can also drive the bicycle comfortably without having to overrun the crank gear or being fatigued by an overload. Stated otherwise, the rider can readily determine whether a shift-up or a shift-down operation should be effected at a glance of the gear indicator, so that the bicycle can be driven much more safely without causing the rider's attention to be distracted for gearshifting.

The transmission gear system further comprises an alarm unit for producing an alarm such as a sound that is indicative of a gearshifting operation when gears are being changed. The alarm unit enables the rider to know that the transmission gear system is in gearshifting operation, with the result that during gearshifting, the rider can refrain from forcibly rotatting the crank gear to cause the chain to de-mesh from the transmission gear, thereby avoiding any damage to the transmission gear system. Therefore, the transmission gear system will have a longer service life.

The above and other features, objects, and advantages of the present invention will become more apparent from the following description when taken in conjunction with the accompanying drawings in which a certain preferred embodiment of the invention is shown by way of illustrative example.

DESCRIPTION OF THE PREFERRED EMBODIMENT

Figure 1:
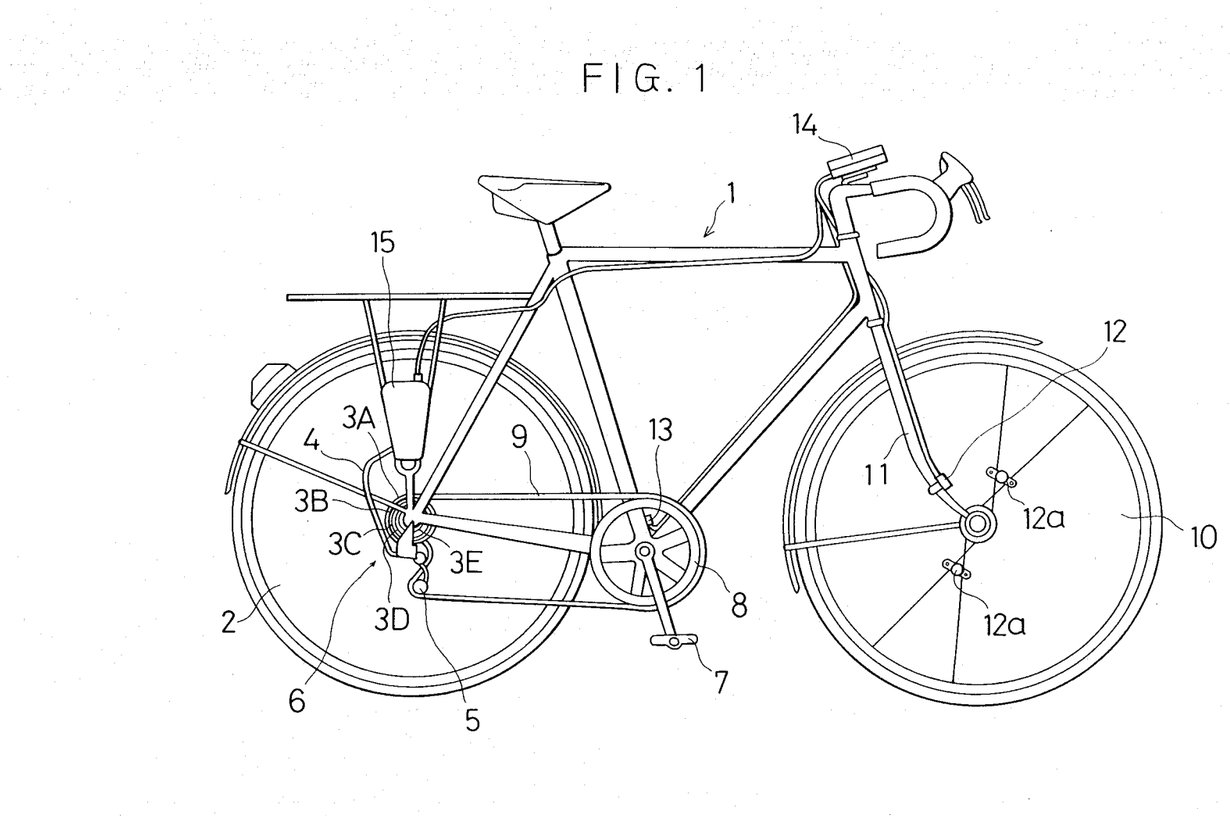
FIG. 1 is a side elevational view of a bicycle equipped with an electrically operated transmission gear system according to the present invention.

As shown in FIG. 1, a bicycle 1 includes a rear wheel 2 on which there is mounted a multiple-speed transmission gear unit 6 including five transmission gears 3A, 3B, 3C, 3D, 3E which are concentrically arranged with each other and the rear wheel 2, a endless chain 9, and a chain guide 5 actuatable by a wire 4 which can be pulled or loosened, as described later on. The bicycle 1 also has a crank gear 8 rotatable when a pedal 7 is foot-driven by a rider of the bicycle 1, and the endless chain 9 held in mesh with the crank gear 8 and in driving mesh with one of the transmission gear at a time to transmit driving power from the crank gear 8 to a selected transmission gear. The endless chain 9 can be shifted stepwise by the chain guide 5 selectively into one of the transmission gears 3A, 3B, 3C, 3D, 3E at a time. Thus, the transmission gear unit 6 as shown has five speed-changing ratios.

Figure 2:
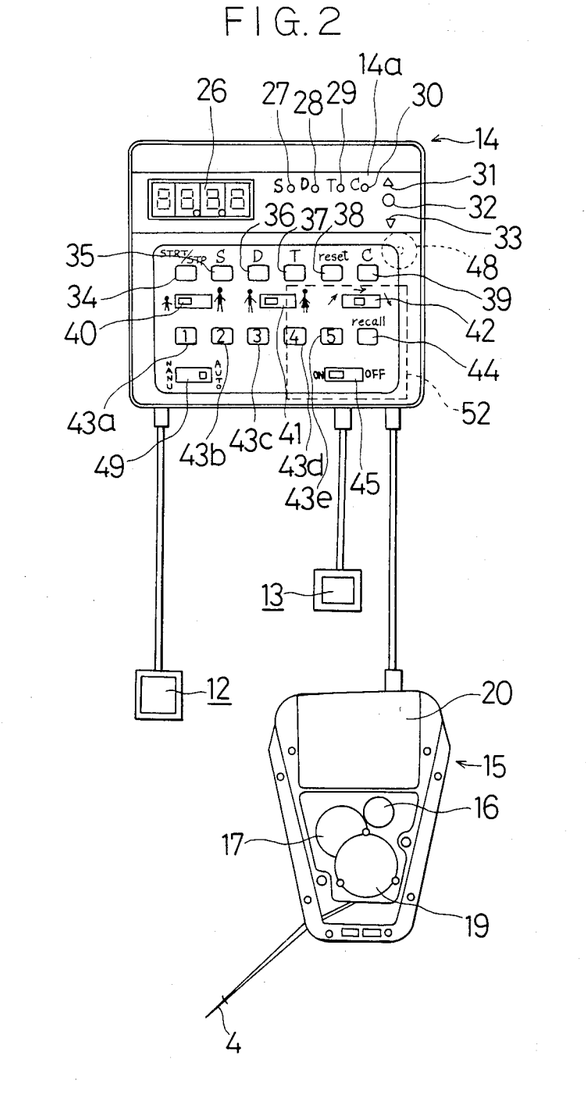
FIG. 2 is a front elevational view of an electrically operated gearshifting mechanism and a control box.

As illustrated in FIG. 2, an electrically operated gearshifting mechanism 15 comprises a reversible motor 16, a speed reduction gear 17, a takeup reel 19 and the wire 4. A DC power supply is 20. A control box 14 which is electrically connected to the gearshifing mechanism 15 contains an electronic circuit (not shown) for producing shift-up, shift-down, and braking signals to enable the reversible motor 16 as powered by the DC power supply 20 to rotate in opposite directions and then to stop. The takeup reel 19 is rotated by the motor 16 to wind or unwind the wire 4, whereupon the wire 4 is pulled or loosened to displace the chain guide 5 in the transmission gear device 6 as shown in FIG. 1 until the endless chain 9 is trained around a desired one of the transmission gears 3A through 3E.

The control box 14 as illustrated in FIG. 2 includes a control panel 14a. The control panel 14a supports thereon a four-figure seven-segment numerical display 26 for displaying speeds of travel of the bicycle, speeds of rotation of the crank gear, or transmission gears used, a speed indication lamp 27, a distance indication lamp 28, a time indication lamp 29, and a crank gear speed indication lamp 30, these lamps 27-30 being indicative of whether the display 26 displays a running speed, a distance travelled, a time travelled, and a speed of rotation of the crank gear. The control panel 14a also includes a shift-up indication lamp 31, a proper gear indication lamp 32, a shift-down indication lamp 33, a start/stop key switch 34, a speed key switch 35, a distance key switch 36, a time key switch 37, a time resetting key switch 38, and a crank gear rotation speed key switch 39. A rider switch 40 serves to produce an input signal indicative of whether the rider is a child or an adult. A sex identification switch 41 delivers, when actuated, an input signal indicative of whether the rider is a male or a female. A topography input switch 42 serves to generate an input signal indicative of whether the bicycle is going to run on an upgrade road, a flat road, or a downgrade road. These switches serve as condition input switches for supplying a microcomputer 46 (later described) with auxiliary conditions used to derive a proper range signal which corresponds one of the transmission gears.

The control panel 14a also comprises first, second, third, fourth and fifth gear designation key switches 43a, 43b, 43c, 43d and 43e for shifting the chain guide 5 into driving mesh with the transmission gears 3A, 3B, 3C, 3D and 3E, respectively, that is, for selecting a desired transmission gear, and a gear recall key switch 44 for enabling the seven-segment numerical display 26 to display the identification number of a transmission gear used. A power supply switch 45 is also supported on the control panel 14a for turning on and off the DC power supply 20 and a control DC power supply 52 in the control box 14. The power supply switch 45 may be located at another position other than on the control panel 14a. The control panel 14a additionally includes a switch 49 for selecting manual or automatic gearshifting operation, and an alarm buzzer 48 for producing a continuous sound or an intermittent sound having a frequencies of about 2.8 KHz and about 3.5 KHz by means of an oscillator contained in the electronic circuit in the control box 14.

Figure 3:
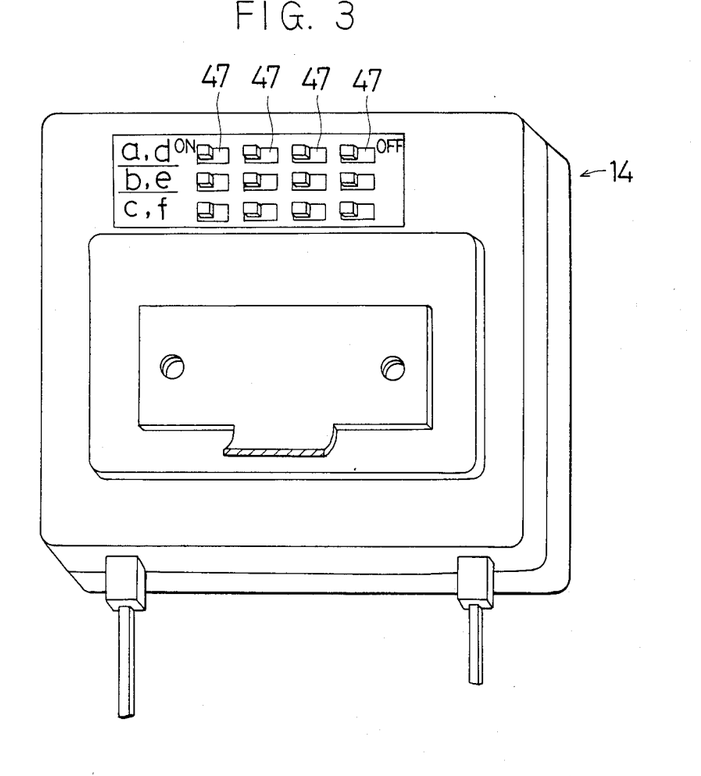
FIG. 3 is a rear view of the control box shown in FIG. 2.

As shown in FIG. 3, the control box 14 has on its rear condition setting switches 47 for supplying the microcomputer 46 with signals of conditional constants a, b, c, d, e, f used to derive proper range signals as will be described later on.

A wheel speed sensor 12 (FIG. 1) contains a Hall generator or reed switch (not shown) for producing an output pulse each time magnets 12a mounted on spokes of a front wheel 10 move past the wheel speed sensor 12.

Figure 4:
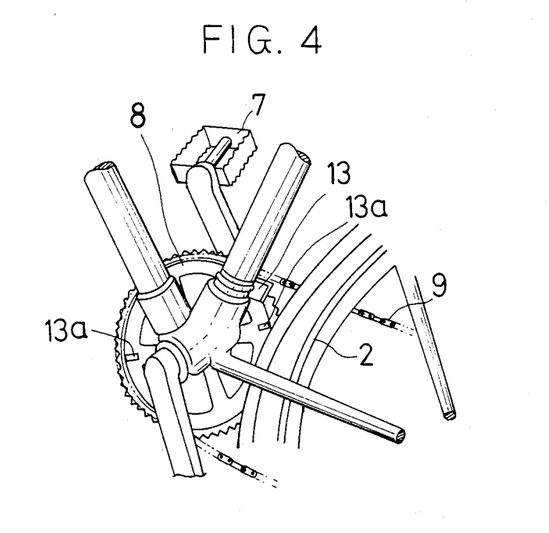
FIG. 4 is a fragmentary perspective view of a portion of the bicycle, showing a crank gear having a crank gear rotation sensor attached thereto.

As shown in FIG. 4, a crank gear rotation sensor 13 similarly contains a Hall generator (not shown) which generate an output pulse when magnets 13a attached to a reverse side of the crank gear 8 move past the crank gear rotation sensor 13. The microcomputer 46 is responsive to the pulses from the sensors 12, 13 for calculating the speed of travel of the bicycle 1 and the speed of rotation of the crank gear 8.

Figure 5A:
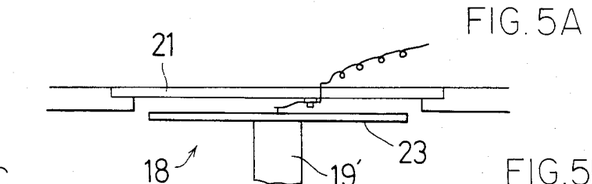
FIG. 5(a) is a plan view of a gear position sensor having a fixed plate and a rotatable plate.
Figure 5B:
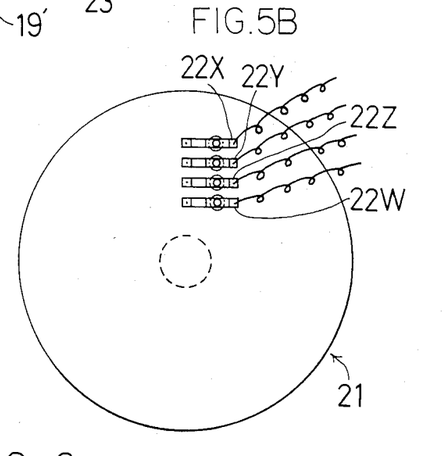
FIG. 5(b) is a front elevational view of the fixed plate shown in FIG. 5(a)
Figure 5C:
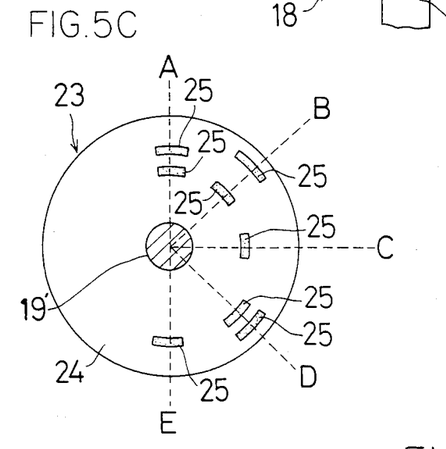
FIG. 5(c) is a front elevational view of the rotatable plate show in FIG. 5(a)

A gear position sensor 18 shown in FIGS. 5(a) through 5(c) serves to detect which transmission gear is in mesh with the endless chain 9, i.e., which transmission gear is selected, and to deliver a detected signal to the electronic circuit in the control box 14. The gear position sensor 18 comprises a fixed circular plate 21 fixed to a speed reduction gear box in the control box 14 and having first, second, third and fourth contacts 22X, 22Y, 22Z and 22W, and a rotatable circular plate 23 made of printed circuit board and mounted on a shaft 19' of the takeup reel 19 for corotation. The rotatable circular plate 23 has a conductive surface 24 of copper foil coextensive with the circular plate 23. The conductive surface 24 includes a plurality of insulated sections 25 which are in radial positional alignment with the first, second and third contacts 22X, 22Y, 22Z, so that the gear position sensor 18 will produce 3-bit binary code signals when the chain guide 5 is shifted respectively to the first transmission gear 3A through the fifth transmission gear 3E. The fourth contact 22W is held in sliding contact with the conductive surface 24 at all times to allow a current to flow through for fourth contact 22W to the conductive surface 24. When the first, second and third contacts 22X, 22Y, 22Z are brought into contact with the conductive surface 24, they allow signals of high logic levels (H) to be transmitted. Conversely, when the contacts 22X, 22Y, 22Z are held against the insulated sections 25, they allow signals of low logic levels (L) to be delivered. Therefore, the first, second and third contacts 22X, 22Y, 22Z will generate signals of H, L, L levels when they are aligned with the position A in which the first transmission gear is selected, signals of L, H, L levels when they are aligned with the postion B in which the second transmission gear is selected, signals of H, H, L in the position C in which the third transmission gear is selected, signals of L, L, H in the position D when the fourth transmission gear is selected, and signals of H, L, H in the position E when the fifth transmission gear is selected.

Figure 6:
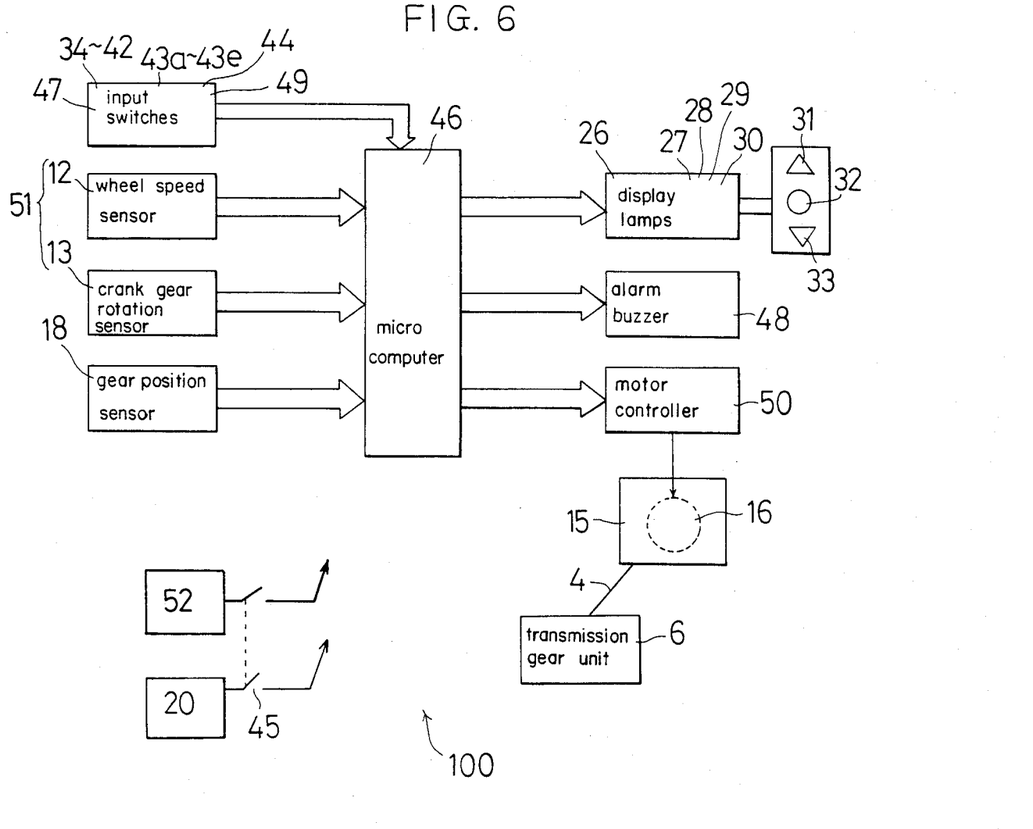
FIG. 6 is a block diagram of the electrically operated transmission gear system according to an embodiment of the present invention.

The microcomputer 46 is part of the electronic circuit contained in the control box 14, and is connected to the sensors, switches, and other components as shown in FIG. 6. Designated at 50 is a motor controller for controlling operation of the motor 16. FIG. 6 is thus illustrative of an electrically operated transmission gear system 100 which comprises the transmission gear unit 6, the electrically operated gearshifting mechanism 15, a speed measurement means 51, the gear position sensor 18, the microcomputer 46, the power supply switch 45, and the DC power supply 20 and 52 such as a battery. The transmission gear system 100 also includes the other switches 34–42, 43a–43e, 44, 47, 49 and the output units 26–33, 48, 50 as described above.

The microcomputer 46 has a memory which stores a program for deriving optimum running speed ranges and crank gear rotation speed ranges which correspond respectively to the five transmission gears in response to actuation of the condition setting switches 47 mounted on the rear of the control box 14.

The program by which the microcomputer 46 operates will now be described.

First, a process for deriving a proper speed range for each transmission gear will be described. Such a proper speed range is defined to enable the rider to drive the bicycle at the maximum efficiency while being subjected to least fatigue, dependent on the rider and various driving conditions. The proper speed range is defined between the highest and lowest speeds $V_T$, $V_B$ of the bicycle, which can be given as follows:

$$V_T = aX \qquad (1)$$

$$V_B = a(X-1) - b \qquad (2)$$

where X is the identification number of a transmission gear used, a and b are constants.

It is assumed that when X=5, the highest speed $V_T$ is substantially ∞, and when $V_B < 0$, $V_B = 0$.

Figure 7:
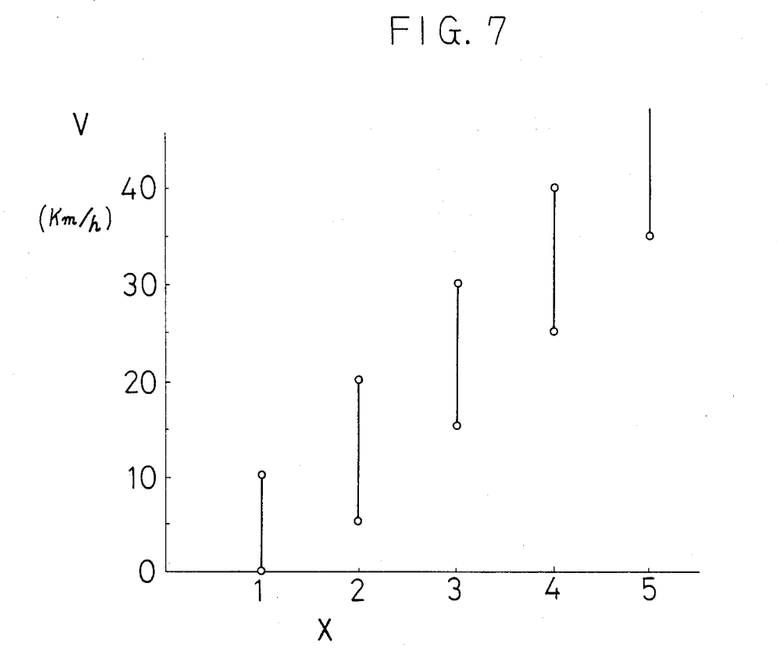
FIG. 7 is a graph showing a relationship between speeds of travel of a bicycle and transmission gears.

The constants a, b can be supplied by the condition setting switches 47 to determine the proper speed ranges for the transmission gears, respectively. As as example, when a=10 and b=5, speeds of travel of the bicycle and transmission gears are related to one another as shown in FIG. 7. The constant a as determined by the switches 47 is an initial one, which in reality will be varied by a compensational constant c as defined by the switches 47 dependent on the rider and auxiliary conditions such as driving conditions for determining a more proper speed range, as will be understood from the flowchart of FIG. 9.

Figure 8:
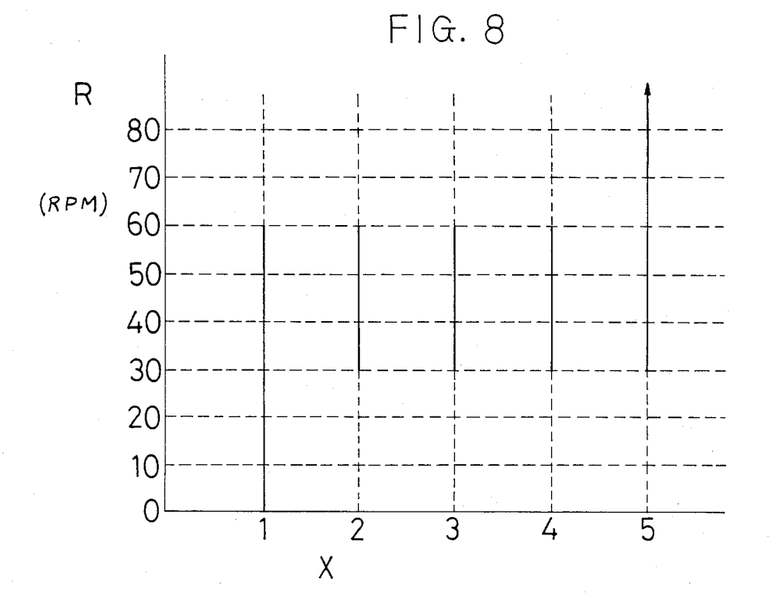
FIG. 8 is a graph showing a relationship between speeds of rotation of a crank gear and transmission gears.

A process for deriving a proper crank gear rotation speed range for each transmission gear will now be described. The crank gear rotation speed range is defined to prevent the rider from overruning the crank gear or driving the bicycle under an excessive load by allowing the crank gear to rotate substantially at a constant speed for each transmission gear. More specifically, with the speed of rotation of the crank gear being indicated by RPM of the crank gear, and assuming that the maximum speed of rotation of the crank gear is expressed as $R_T$ (RPM), and the minimum speed of rotation of the crank gear as $R_B$ (RPM), the following relationships are defined: $R_T = d$, $R_B = 0$ when the first transmission gear is selected, $R_T = d$, $R_B = e$ for the second through fourth transmission gears, and $R_T =$ substantially infinite, $R_B = e$ for the fifth transmission gear. Such relationships are stored in the memory of the microcomputer 46. By supplying the constants d, e as inputs via the condition setting switches 47, an optimum crank gear rotational speed range can be determined for each transmission gear. For example, when d=60 (RPM) and e=30 (RPM), speeds of rotation of the crank gear 8 and transmission gears have a relationship as illustrated in FIG. 8. The constants d, e as determined by the switches 47 are initial ones, which in reality will be modified for more correct values by a compensational constant f as supplied by the condition setting switches 47 dependent on the bicycle rider and driving conditions, as will be understood from the flowchart of FIG. 10. When the bicycle runs due to inertia without rotating the crank gear 8, the RPM of the latter is substantially zero. To exclude such a situation, no comparison between $V_3$, $V_4$ is effected when a measured speed of rotation of the crank gear is in the range of from 0 (RPM) to 5 (RPM).

Figure 9:
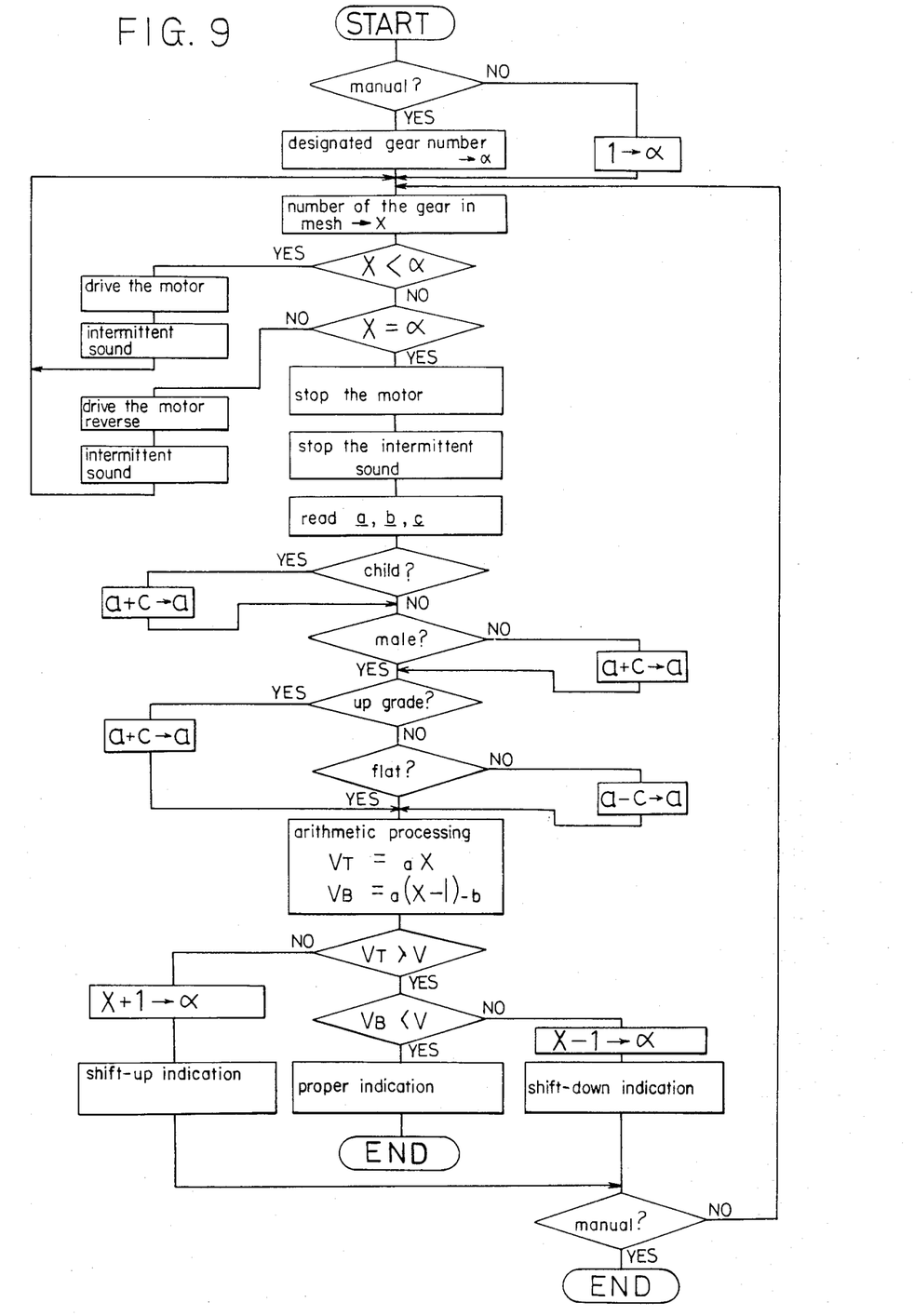
FIG. 9 is a flowchart for operations to derive a proper range of running speeds from a transmission gear.

Operation of the transmission gear system 100 will be described. The power supply switch 45 is turned on, and the switch 49 is shifted for the automatic mode of operation. Then, information on the rider is fed in as input signals by the rider switch 40 and the sex identification switch 41, and topographic information is fed by the topography switch 42, and the condition setting switches 47 are actuated as desired. Thereafter, the speed key switch 35 is depressed, whereupon output pulses from the wheel speed sensor 12 are counted and processed by the electronic circuit in the control box 14 to display a digital indication of a running speed on the numerical display 26 and to energize the speed indication lamp 27. Then, a proper range of speeds of travel which corresponds to the transmission gear that meshes with the endless chain 9 is compared with a current speed as measured of travel of the bicycle 1, according to the processing steps as shown in FIG. 9. When actual running speed is greater than the maximum speed in the proper speed range, the shift-up indication lamp 31 is lighted, and a shift-up signal is generated to select a transmission gear which brings the actual running speed into the proper speed range. Conversely, when the actual speed is lower than the minimum speed in the proper speed range, the shift-down indication lamp 33 is energized, and a shift-down signal is produced to select a transmission gear by which the actual speed of the bicycle is changed so as to be in the proper speed range.

The motor control circuit 50 is responsive to the supplied shift-up signal or shift-down signal to rotate the motor 16 (FIG. 2) in one direction to shift up transmission gears or in the opposite direction to shift down transmission gears. When the gear position sensor 18 produces a gear position signal which is a binary code corresponding to a transmission gear selected for bringing the actual running speed into the proper speed range, a braking signal is issued to de-energize the motor 16. Therefore, the transmission gear system 100 enables the transmission gear device 6 to maintain a transmission gear in operation which corresponds to the running speed. When the actual running speed is within the proper speed range, the proper gear indication lamp 32 is lighted.

When the crank gear rotational speed key switch 39 is depressed, output pulses from the crank gear rotation sensor 13 are counted and processed by the electronic circuit in the control box 14. The speed of rotation of the crank gear 8 is digitally displayed on the numerical display 26, and at the same time the crank gear speed indication lamp 30 is energized. Then, an actual speed as measured of rotation of the crank gear 8 is compared with a proper range of speeds of rotation of the crank gear 8, which corresponds to a transmission gear as currently selected, in accordance with the procedure shown in FIG. 10. When the actual speed of rotation of the crank gear is higher than the maximum speed in the proper speed range, the shift-up indication lamp 31 is lighted, and a shift-up signal is generated to select a transmission gear by which the actual crank gear speed is brought into the proper speed range. Conversely, when the actual crank gear speed is smaller than the minimum speed in the proper speed range, the shift-down indication lamp 33 is energized, and a shift-down signal is issued to pick out a transmission gear which varies the actual crank gear speed so as to be within the proper speed range.

Figure 10:
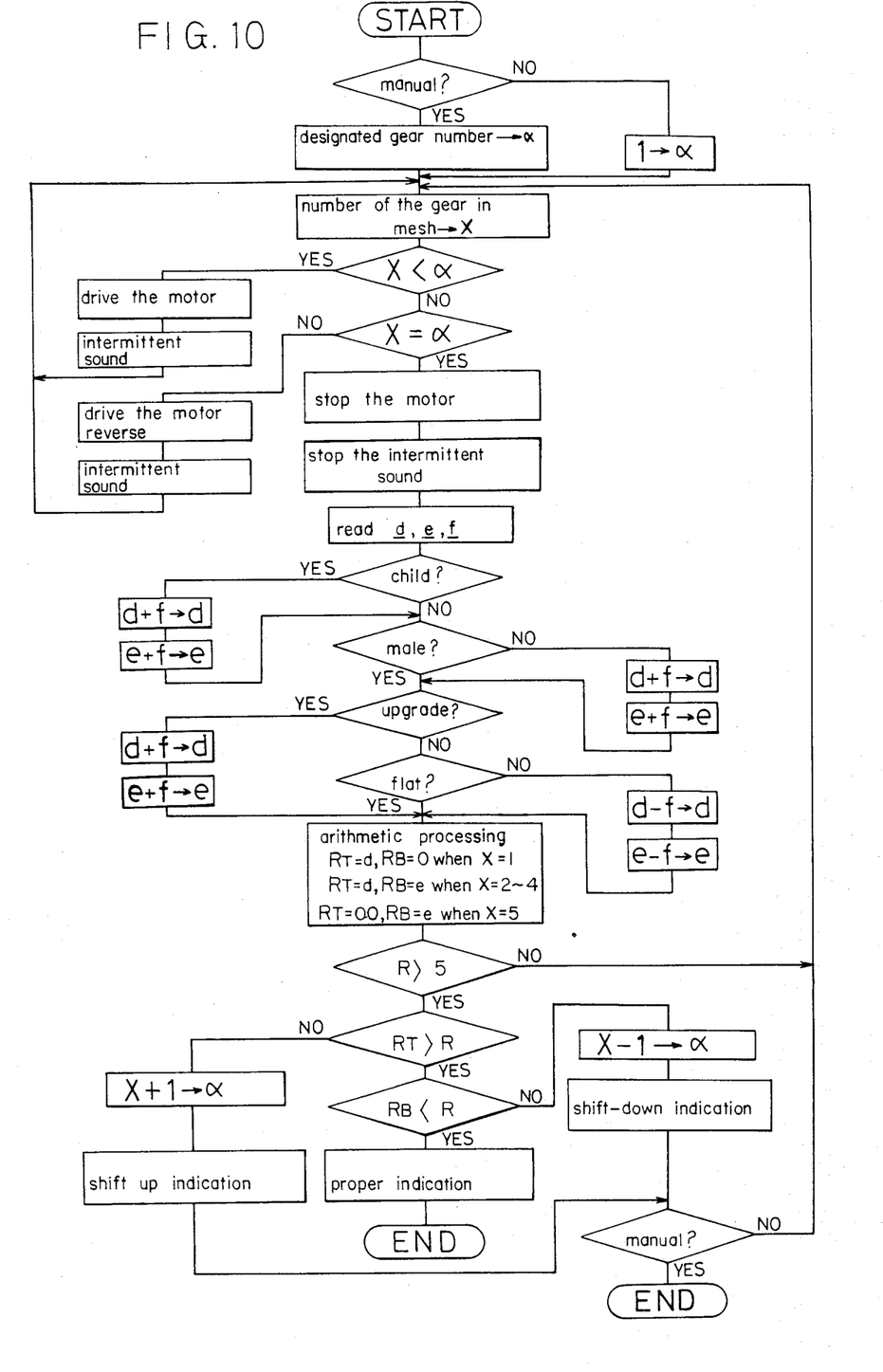
FIG. 10 is a flowchart for operations to derive a proper range of speeds of rotation of a crank gear from a transmission gear.

In response to such a shift-up signal or a shift-down signal as supplied, the motor control circuit 50 rotates the motor 16 in one or opposite direction to actuate the transmission gear unit 6 for bringing the actual crank gear speed into the proper speed range. When the actual crank gear speed falls within the proper speed range, the proper gear indication lamp 32 is lighted to indicate that a transmission gear as selected corresponds properly to the crank gear speed.

When the distance key switch 36 or the time key switch 37 is depressed, the numerical display 26 displays a distance travelled or a time spent. At this time, the procedural steps shown in FIG. 9 remain to be effected if they have been carried out prior to the depression of the switch 36 or 37, and the procedural steps shown in FIG. 10 remain to be effected if they have been carried out prior to the depression of the switch 36 or 37.

When the switch 49 is shifted to the manual position, a transmission gear which corresponds to one of the first through fifth gear designation key switches 43a–43e which has been depressed by the rider is selected on a priority basis. The other operations are the same as those described above. Therefore, the rider can easily maintain a proper transmission gear by depressing either one of the switches 43a–43e dependent on the indications on the lamps 31, 32 and 33, and also can select any desired transmission gear at will.

The microcomputer 46 enables the alarm buzzer 48 to give off a continuous alarm sound for a certain period of time when the rider depresses one of the first through fifth gear designation key switches 43a–43e, indicating that such a switch has been acted upon. While the motor 16 is being in operation, the alarm buzzer 48 produces an intermittent sound to let the rider know that the motor 16 is still operated, that is, the endless chain 9 is being shifted to one of the transmission gears. After the motor 16 has been de-energized, the alarm buzzer 48 generates a continuous sound for a certain interval of time to give the rider an indication that the gearshifting has been over. The intermittent sound generated during a gearshifting operation is of a higher frequency for shift-up and of a lower frequency for shift-down.

The shift-up indication lamp 31, the proper gear indication lamp 32, and the shift-down indication lamp 33 may be dispensed with, and the numerical display 26 may be used to indicate a shift-up operation, a proper gear selected, and a shift-down operation.

Where a gear position signal supplied from the gear position sensor 18 is a signal which does not correspond to any of the transmission gears at the time of starting a gearshifting operation, it is preferable that the motor 16 rotate in a direction to shift down transmission gears until a gear position signal corresponding to any one of the transmission gears is detected, and then the gearshifting operation be carried out to avoid an erroneous operation of the transmission gear device. To prevent the motor 16 from rotating beyond the positions A or E (FIG. 5(c)) which corresponds to the lowest or highest transmission gear, it is preferred to provide positional detection insulated sections at positions displaced slightly off the positions A and E remotely from the positions B, D for enabling the motor to return the rotatable disc 23 to the position A or E when a positional signal is detected from such additional insulated sections.

It is also preferable that the motor 16 be forcibly stopped after continuous energization thereof for more than a certain period of time, and malfunctioning display be effected at the same time, for thereby preventing the motor 16 from keeping on rotating due to a failure of the gear position sensor 18 or other malfunctioning.

The endless chain can be shifted smoothly into driving mesh with a new transmission gear by displacing the chain guide beyond a position aligned with the new transmission gear in such a gearshifting direction and then by stopping the chain guide. To carry out such an operation, the guide may be arranged so that it will stop a predetermined time after a positional signal for the new transmission gear has been detected, or the motor 16 may be continuously driven until such a positional signal is no longer detected and then reversed and stopped a certain period of time after the positional signal has disappeared.

The DC power supply 20 used for gearshifting and the DC power supply 52 used for controlling operation may comprise a primary battery, a secondary batter, a solar cell, or a combination of a dynamo and a DC converter circuit.

Although a certain preferred embodiment has been shown and described in detail, it should be understood that various changes and modifications may be made therein without departing from the scope of the appended claims.

What is claimed is:

1. An electrically operated transmission gear system for a bicycle, comprising:
   a transmission gear unit including a plurality of transmission gear, an endless chain, and a guide for guiding said endless chain into driving mesh with one of said transmission gears at a time;
   an electrically operated gearshifting mechanism including a reversible motor, a takeup reel actuatable by said reversible motor, and a wire joined to said takeup reel and said guide for displacing the latter in response to rotation of said takeup reel to shift said endless chain into driving mesh with one of said transmission gears;
   means for measuring the speed at which the bicycle is running and/or the speed of rotation of a crank gear of the bicycle with which said endless chain is in mesh;
   means for detecting which transmission gear is in mesh with said endless chain;
   an arithmetic unit for deriving a proper range signal from an output from one of said measuring and detecting means and for comparing said proper range signal with an output from the other means to determine whether the transmission gear with which said endless chain is in mesh is proper or not;
   a gear position display for displaying an output signal from said arithmetic unit to indicate that the transmission gear held in mesh with said endless chain is too low a transmission gear, too high a transmission gear, or in a proper range;
   a gear designation switch;
   means for controlling operation of said reversible motor in response to an output signal from said gear designation switch to bring said endless chain into driving mesh with a designated transmission gear;
   a source of DC electric power for powering said reversible motor and said arithmetic unit; and
   a switch for turning on and off said source of DC electric power; whereby gearshifting for the bicycle can manually be controlled properly.

2. An electrically operated transmission gear system according to claim 1, wherein said measuring means comprises at least one magnet attached to a spoke of a front wheel of the bicycle, a front wheel speed sensor including a magnetic field sensor attached to a front fork of the bicycle, and an arithmetic unit for deriving a running speed of the bicycle from an output from said front wheel speed sensor.

3. An electrically operated transmission gear system according to claim 2, wherein said arithmetic unit comprises a microcomputer.

4. An electrically operated transmission gear system according to claim 1, wherein said measuring means comprises at least one magnet attached to said crank gear, a crank gear rotation sensor including a magnetic field sensor attached to a body pipe of the bicycle, and an arithmetic unit for deriving a speed of rotation of the crank gear from an output from said crank gear rotation sensor.

5. An electrically operated transmission gear system according to claim 4, wherein said arithmetic unit comprises a microcomputer.

6. An electrically operated transmission gear system according to claim 1, wherein said detecting means comprises a fixed plate having a plurality of contacts, and a rotatable plate rotatable with said takeup reel while in contact with said contacts for supplying the latter with positional signals which correspond respectively to said transmission signals 7. An electrically operated transmission gear system according to claim 6, wherein said positional signals comprise binary codes indicative respectively of said transmission gears.

8. An electrically operated transmission gear system according to claim 7, wherein said transmission gears are numbered at 1, 2, 3, 4 . . . from the lowest to highest gears.

9. An electrically operated transmission gear system according to claim 1, wherein said arithmetic unit comprises a microcomputer.

10. An electrically operated transmission gear system according to claim 9, wherein said transmission gears are five in number and numbered at 1, 2, 3, 4 and 5 from the lowest to highest gears, said detecting means being capable of producing output X indicative of said numbers of the transmission gears.

11. An electrically operated transmission gear system according to claim 10, wherein said microcomputer is programmed such that it will perform the following arithmetic operations:

$$V_T = aX$$

$$V_B = a(X-1) - b$$

where V is the output from the measuring means indicative of the speed of travel of the bicycle, a and b are conditional constants, $V_T$ is substantially infinite when X=5, and $V_B$ has a minimum value of 0, will define a proper range between $V_B$ and $V_T$, will compare V with the proper range, will determine that the transmission gear held in mesh with said endless chain is too low a transmission gear when V is greater than $V_T$, too high a transmission gear when V is smaller than $V_B$, and proper when V is between $V_B$ and $V_T$.

12. An electrically operated transmission gear system according to claim 10, wherein said microcomputer is programmed such that it will determine that $R_T = d$, $R_B = 0$ when X=1, $R_T = d$, $R_B = e$ when X=2 to 4, and $R_T$ is substantially infinite, $R_B = e$ when X=5
   where R is the output from the measuring means indicative of the speed of rotation of the crank gear, and d and e are conditional constants, will define a proper R range between $R_B$ and $R_T$, will compare R with the proper range, will determine that the transmission gear held in mesh with the endless chain is too low a transmission gear when R is greater than $R_T$, too high a transmission gear when R is smaller than $R_B$, and proper when R is between $R_B$ and $R_T$.

13. An electrically operated transmission gear system according to claim 1, further including a control panel attachable to a handle bar of the bicycle, said power supply switch is mounted on said control panel.

14. An electrically operated transmission gear system according to claim 1, wherein said DC power supply comprises a primary battery.

15. An electrically operated transmission gear system according to claim 1, whrein said DC power supply comprises a secondary battery.

16. An electrically operated transmission gear system according to claim 1, wherein said DC power supply comprises a solar cell.

17. An electrically operated transmission gear system according to claim 1, wherein said DC power supply comprises a dynamo and a DC converter circuit.

18. An electrically operated transmission gear system according to any one of claims 1 through 17, further including means for controlling operation of said reversible motor based on an output signal from said arithmetic unit to bring said endless chain into driving mesh with a proper transmission gear, whereby gearshifting for the bicycle can automatically be controlled properly.

19. An electrically operated transmission gear system according to claim 13, further including means on said control panel for supplying said arithmetic unit with auxiliary condition signals such as road condition and rider information signals to derive said proper range signal.

20. An electrically operated transmission gear system according to claim 18, further including means on said control panel for producing an alarm signal indicating an gearshifting operation in response to an output from said controlling means.

21. An electrically operated transmission gear system according to claim 1, further including means on said control panel for producing an alarm signal indicating an gearshifting operation in response to an output from said controlling means.

22. An electrically operated transmission gear system according to claim 20, wherein said alarm signal comprises a sound.

23. An electrically operated transmission gear system according to claim 21, wherein said alarm signal comprises a sound.

24. An electrically operated transmission gear system according to claim 18, further including means for driving said reversible motor in a direction to shift down transmission gears until any positional signal is detected when an output signal from said detecting means is a signal not corresponding to any positional signal at the time of starting a gearshifting operation.

25. An electrically operated transmission gear system according to claim 22, wherein said detecting means being capable of producing positional signals correponding to said transmission gears and a signal corresponding to a lower limit position beyond the lowest transmission gear position in a shift-down direction.

26. An electrically operated transmission gear system according to claim 23, further including means for forcibly stopping said reversible motor after the latter has been continuously energized for a predetermined period of time or longer.

27. An electrically operated transmission gear system according to claim 18, wherein said guide is displaceable in a gearshifting direction beyond a position aligned with a transmission gear with which said endless chain is to mesh during a gearshifting operation.

28. A bicycle equipped with an electrically operated transmission gear system according to claim 1.

29. An electrically operated transmission gear system according to claim 13 wherein said gear position display is mounted on said control panel.

30. An electrically operated transmission gear system according to claim 29 wherein said gear designation switch is mounted on said control panel.

* * * * *